(12) United States Patent
Morita

(10) Patent No.: US 7,831,256 B2
(45) Date of Patent: Nov. 9, 2010

(54) MOBILE COMMUNICATION SYSTEM AND ACCESS CONTROL METHOD

(75) Inventor: Motoki Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 1040 days.

(21) Appl. No.: 10/546,382

(22) PCT Filed: Jun. 23, 2004

(86) PCT No.: PCT/JP2004/008805

§ 371 (c)(1),
(2), (4) Date: Oct. 19, 2006

(87) PCT Pub. No.: WO2005/002270

PCT Pub. Date: Jan. 6, 2005

(65) Prior Publication Data

US 2007/0037581 A1 Feb. 15, 2007

(30) Foreign Application Priority Data

Jun. 25, 2003 (JP) ............................. 2003-181328

(51) Int. Cl.
*H04W 72/00* (2009.01)
(52) U.S. Cl. ................. 455/453; 455/452.1; 455/452.2; 455/450
(58) Field of Classification Search ................. 455/453, 455/450, 452.1, 452.2
See application file for complete search history.

(56) References Cited

U.S. PATENT DOCUMENTS 6,738,625 B1 * 5/2004 Oom et al. .................. 455/453

(Continued)

FOREIGN PATENT DOCUMENTS

JP 60-90442 5/1985

(Continued)

OTHER PUBLICATIONS

3 GPP (3rd Generation Partnership Project), Extended Abstract R3-030020, Target Architecture for UTRAN Evolution (Nokita), TSG-RAN Working Group 3 ReI6 Adhoc in Workingham, Berkshire, UK, Jan. 17, 2003.

*Primary Examiner*—Vincent P Harper
*Assistant Examiner*—Dung Lam
(74) *Attorney, Agent, or Firm*—McGinn IP Law Group, PLLC

(57) ABSTRACT

A mobile communication system includes a mobile station (5) connected to a core network (1) through a communication line intervened by a base station (3*a*), and a radio control station (2) configured for controlling the setting of a radio link for the mobile station (5) in the base station (3*a*). The base station (3*a*) monitors the congested state of the communication line, generates a state indicator indicating the congested state/non-congested state of the communication line, based on the results of monitoring, and transmits the state indicator generated to the radio control station (2). The radio control station (2) recognizes the current state of the communication line based on the state indicator received from the base station (3*a*).

When the radio control station (2) recognizes that the communication line is in the congested state and receives a line connection request from the mobile station (5), the control station (2) transmits a control signal for refusing the line connection request received to the mobile station (5) without performing control for setting the radio link.

6 Claims, 15 Drawing Sheets

U.S. PATENT DOCUMENTS

| | | | |
|---|---|---|---|
| 2002/0077113 A1* | 6/2002 | Spaling et al. | 455/453 |
| 2002/0082023 A1* | 6/2002 | Bark et al. | 455/453 |
| 2003/0003921 A1* | 1/2003 | Laakso | 455/453 |
| 2003/0117974 A1* | 6/2003 | Kang | 370/328 |
| 2003/0156580 A1* | 8/2003 | Abraham et al. | 370/389 |
| 2005/0118993 A1* | 6/2005 | Roux et al. | 455/423 |

FOREIGN PATENT DOCUMENTS

| | | |
|---|---|---|
| JP | 9-506484 | 6/1997 |
| JP | 2000-504530 | 4/2000 |
| JP | 2002-271423 | 9/2002 |
| WO | WO 95/14341 | 5/1995 |
| WO | WO 98/24199 | 6/1998 |
| WO | WO 01/05179 A1 | 1/2001 |

* cited by examiner

MOBILE COMMUNICATION SYSTEM AND ACCESS CONTROL METHOD

TECHNICAL FIELD

This invention relates to a mobile communication system exploiting multiple access, represented by code division multiple access (CDMA), and to an access accepting system for such system.

BACKGROUND ART

In the CDMA mobile communication system, the same radio frequency range is co-used by many users, and a base station distinguishes many users by spreading codes. With increase in the number of users, simultaneously connected to the same base station, there result increasing interferences by the communication employing the same frequency. With increase in interferences, the communication quality with the individual users is gradually deteriorated, such that the probability becomes higher that the desired signal quality cannot be achieved. If, with the view to keeping communication quality, limitations are imposed on the quantity of interferences, the number of users that may be connected to the same base station is decreased, thus leading to a reduced capacity.

That is, in the CDMA mobile communication system, there persists a correlation between the quality of communication and the communication capacity, and hence the acceptance control for a wireless section, deciding whether or not a user's line connection request is to be accepted, that is, access acceptance control, becomes crucial.

As indices for decision, used in such acceptance control, the quantity of uplink interferences, approximating the total received power in a spread band, received by the base station, and the downlink transmission power, as the total transmission power of the base station, are used for the uplink of transmission from the mobile station to the base station and for the downlink of transmission from the base station to the mobile station, respectively. The quantity of uplink interferences and the downlink transmission power are correlated with the load to a radio jurisdiction in each of the uplink and downlink.

The line connection requests from a mobile station may be classed into a new call, produced by a call initiated or a call incoming, and a handover call, produced by handover from another radio jurisdiction. In the acceptance control, the usual practice is to accept handover call preferentially, in order to prevent the communication line from being forcibly disconnected to affect the communication quality despite the fact that a mobile station is communicating in a radio jurisdiction the mobile station has moved to.

As typical of the base station, capable of performing the above-described acceptance control, there is, for example, a base station described in Non-Patent Publication 1. This base station has the function of incessantly measuring the quantity of the uplink and the downlink transmission power for a user whose line connection request has been allowed by acceptance control to monitor whether or not the wireless section is congested with connected users. In case the wireless section is congested, the line connection requests from the user is refused, as a principle, except in case of an emergency, and processing e.g. of lowering the speed of communication stepwise is carried out, beginning from users exploiting high-speed services of packet communication.

Non-Patent Publication 1: 3 GPP (3rd Generation Partnership Project), Extended Abstract R3-030020, Target Architecture for UTRAN Evolution (Nokita), TSG-RAN Working Group 3 Rel6 Adhoc in Wokingham, Berkshire, UK, 17 Jan., 2003

DISCLOSURE OF THE INVENTION

Problems to be Solved by the Invention

However, the above-described conventional acceptance control suffers from the following problems:

The acceptance control and monitoring of the state of congestion are carried out in a base station, while the results of monitoring are not reported to the radio control station controlling the setup of the radio link of the base station. Thus, the radio control station is unable to comprehend the state of congestion in the radio jurisdiction. On the other hand, the line connection request issued from the mobile station is received by the radio control station. Hence, even if the radio jurisdiction is in a congested state, such that the line connection cannot be performed due to such congested state, the radio control station sends a control signal for setting up the radio link to the base station, responsive to a line connection request sent from the base station. In addition, the radio control station itself performs the processing needed for such setting. The result is that unneeded processing load is increased in the radio control station, while unneeded processing load or control signal traffic is reciprocated between the radio control station and the base station. This unneeded processing load as well as unneeded control signal traffic is increased with increase in the number of the mobile stations and in the frequency of line connection requests to the radio control station.

It is an object of the present invention to provide a mobile communication system, and an access accepting control method, whereby the above problem may be solved and unneeded processing load in the radio control station or unneeded transmission/reception of control signals may be diminished. It is another object of the present invention to provide a base station, a radio control station and a user control station used in such communication system.

MEANS TO SOLVE THE PROBLEM

For accomplishing the above objects, the present invention provides a first mobile communication system comprising a base station connected to a core network, at least one mobile station connected to the core network via a communication line intervened by the base station, and a radio control station for controlling the setting of a radio link in the base station for the mobile station. The base station monitors whether or not the communication line is congested and, based on the results of monitoring, produces a state indicator indicating which of the congested state and the non-congested state is the current state of the communication line. The base station sends the state indicator to the radio control station each time state transition occurs between the congested state and the non-congested state. The radio control station recognizes the current state of the communication line based on the state indicator received from the base station. When the communication line is recognized to be congested, and a request for line connection is received from the mobile station, the radio control station transmits to the mobile station a control signal to the effect that the request for line connection received shall be refused, without performing control for setting the radio link.

A second mobile communication system of the present invention comprises a user control station connected to a core network, a base station connected to the user control station, at least one mobile station connected to the core network through a communication line intervened by the base station, and a radio control station controlling the setting of a radio link in the base station for the mobile station. Based on the results of monitoring, the user control station monitors whether or not the communication line is congested, and produces a state indicator indicating which of the congested state and the non-congested state is the current state of the communication line. The user control station transmits the state indicator to the radio control station each time state transition occurs between the congested state and the non-congested state. The radio control station recognizes the current state of the communication line based on the state indicator received from the user control station. If the communication line has been recognized to be in congested state, and a line connection request is received from the mobile station, the radio control station transmits to the mobile station a control signal to the effect that the line connection request received shall be refused, without performing control for setting the radio link.

A first method for controlling access acceptance, according to the present invention, is carried out in a mobile communication system comprising a base station connected to a core network, at least one mobile station connected to the core network via a communication line intervened by the base station, and a radio control station for controlling the setting of a radio link in the base station for the mobile station. The method comprises a first step of the base station monitoring whether or not the communication line is congested, and reporting the results to the radio control station, and a second step of the radio control station transmitting, on receipt of a line connection request from the mobile station following the receipt from the base station of a report indicating the congested state of the communication line, a control signal to the effect that the line connection request received shall be refused, without exercising control for setting the radio link.

A second method for controlling access acceptance, according to the present invention, is carried out in a mobile communication system comprising a user control station connected to a core network, a base station connected to the user control station, at least one mobile station connected to the core network through a communication line, intervened by the base station, and a radio control station controlling the setting of a radio link in the base station for the mobile station. The method comprises a first step of the user control station monitoring whether or not the communication line is congested, and transmitting the results of monitoring to the radio control station, and a second step of the radio control station transmitting, on receipt of a line connection request from the mobile station following the receipt from the user control station of a report indicating the congested state of the communication line, a control signal to the effect that the line connection request received shall be refused, without exercising control for setting the radio link.

A radio control station according to the present invention is used in a mobile communication system, in which at least one mobile station is connected to a core network through a communication line intervened by a base station. The radio control station controls the setting of a radio link in the base station for the mobile station. The radio control station includes a state indicator storage unit for receiving a state indicator, indicating which of the congested state and the non-congested state is the current state of the communication line, from an external station, and for storing the state indicator received, each time state transition occurs between the congested state and the non-congested state, and a line connection request receiving unit recognizing, on receipt of a line connection request from the mobile station, the current state of the communication line, based on the state indicator, stored in the state indicator storage unit. The line connection request receiving unit refuses the line connection request received, in case the communication line is recognized to be in a congested state, while allowing the line connection request received, in case the communication line is recognized to be in a non-congested state. The radio control station also includes a line connection request response unit for transmitting, in case the line connection request receiving unit has refused the line connection request received, a control signal indicating such effect to the mobile station. In case the line connection request receiving unit has accepted the line connection request received, the line connection request response unit transmits a control signal for setting the radio link to the base station.

A base station according to the present invention is connected to a core network, and supervises at least one radio jurisdiction, in which the setting of a radio link for a mobile station belonging to the radio jurisdiction is controlled by a radio control station. The base station comprises a measurement unit for measuring the degree of congestion in a communication line used for connecting the mobile station to the core network, a threshold value storage unit having stored therein a preset threshold value usable for deciding whether or not the communication line is congested, and a state indicator generation unit for formulating a state indicator indicating which of the congested state and the non-congested state is the current state of the communication line, based on the results of comparison of the degree of congestion, obtained by the measurement unit, to the preset threshold value stored in the threshold value storage unit. The state indicator generation unit sends the state indicator generated to the radio control station.

A user control station according to the present invention relays between a core network and a base station, a radio link of which for a mobile station belonging to a radio jurisdiction supervised by the base station itself is controlled by a radio control station. The user control station comprises a threshold value storage unit having stored therein a preset threshold value for deciding whether or not the communication line, intervened by the base station, for connecting the mobile station to the core network, is congested, and a state indicator generation unit for receiving measured results of the degree of congestion in the communication line from the base station, for comparing the degree of congestion received to the preset threshold value stored in the threshold value storage unit, for formulating a state indicator indicating which of the congested state and the non-congested state is the current state of the communication line, based on the results of comparison, and for sending the state indicator generated to the radio control station.

MERITORIOUS EFFECT OF THE INVENTION

According to the present invention, such a meritorious effect may be derived that unneeded processing for setting radio links under a congested state may be eliminated, and hence the processing load in the radio control station may be diminished, whilst transmission/reception of unneeded control signals between the radio control station and the base station may be diminished. There is also derived such an additional meritorious effect that, since the processing load on the part of the radio control station, or unneeded control signals, may be diminished, signal delay may be reduced, while the load on the network may also be relieved.

With the first and second mobile communication systems according to the present invention, in which, if the communication line is congested, such effect is reported to the radio control station, and hence the radio control station may comprehend the congested state in the communication line. Moreover, with the radio control station, if, as the communication line is congested, a line connection request from a mobile station is received, the radio control station refuses the line connection request received, without exercising control for setting the radio link, and hence there is no possibility of transmission/reception of unneeded control signals between the radio control station and the base station as was the case with the conventional system.

With the first and second access acceptance controlling methods of the present invention, in which the state of congestion of communication lines is reported to the radio control station, it is possible for the radio control station to grasp the occurrence of congestion in the communication line, thus eliminating the risk of transmission/reception of unneeded control signals between the radio control station and the base station.

With the radio control station of the present invention, reports on the state of congestion of the communication line are made from an external station, such as base station or user control station, it is possible to comprehend the occurrence of congestion in the communication line. If, as the communication line is congested, a line connection request is received from a mobile station, the line connection request received is refused, without managing control for setting the radio link, so that there is no risk of unneeded control signals being exchanged with the base station, as was the case with the conventional system.

With the base station of the present invention, reports on the state of congestion of the communication line are made to the radio control station. With use of this base station, it is possible to implement the above-described first mobile communication system of the present invention.

With the user control station of the present invention, reports on the state of congestion of the communication line are made to the radio control station. With use of this base station, it is possible to implement the above-described second mobile communication system of the present invention.

Figure 1:
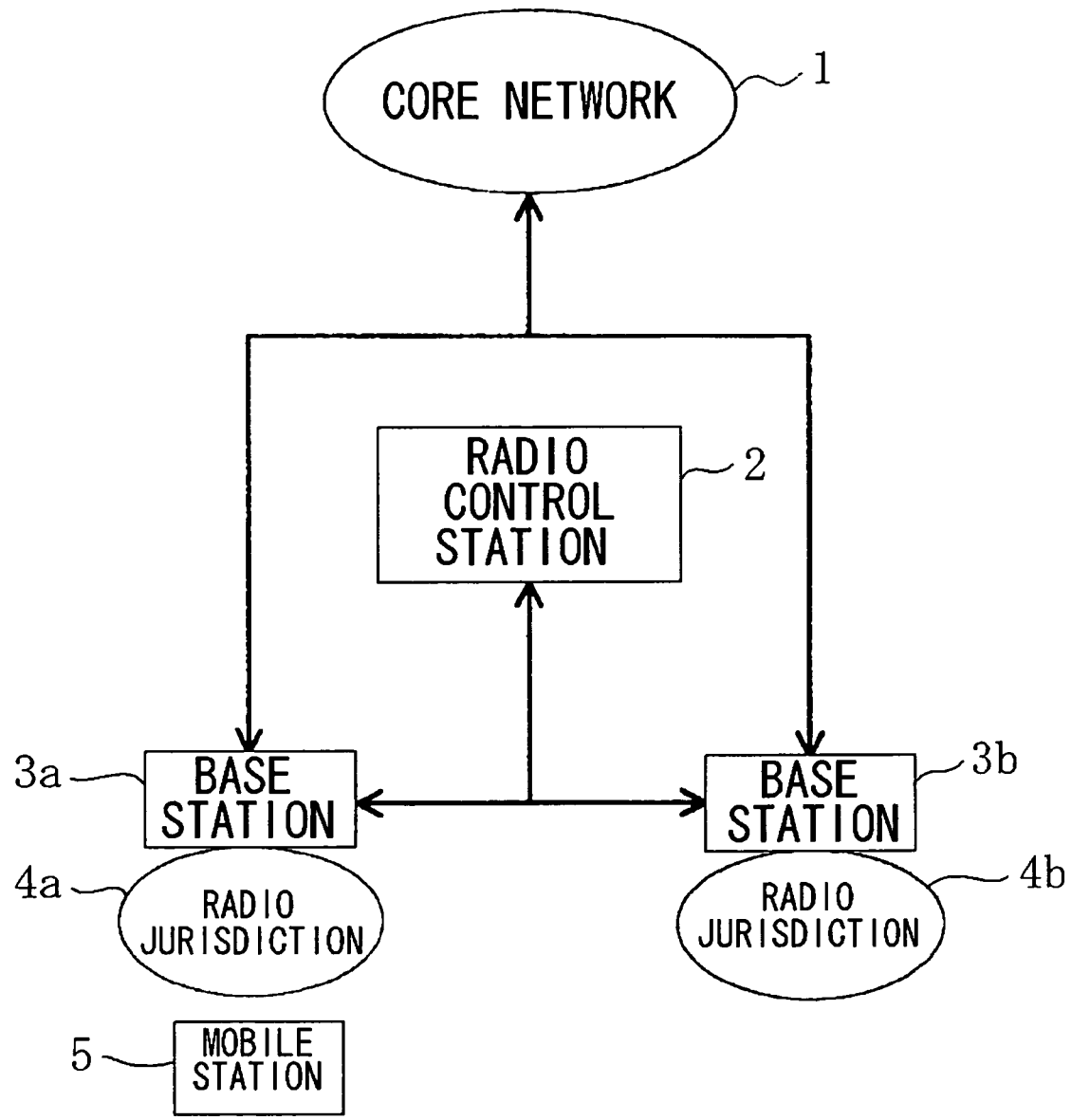
FIG. 1 is a block diagram showing a schematic configuration of a mobile communication system according to a first embodiment of the present invention.

EXPLANATION OF NUMERALS 1 core network
2 radio control station
3a, 3b base stations
4a, 4b radio jurisdictions
5 mobile station
201 measurement unit
202 threshold value storage unit
203 state indicator generation unit
401 state indicator storage
402 communication traffic synthesis unit
403 line connection request receiving unit
404 line connection request response generation unit

PREFERRED EMBODIMENTS OF THE INVENTION

Referring to the drawings, preferred embodiments of the present invention will be described in detail.

First Embodiment

FIG. 1 shows a schematic configuration of a mobile communication system according to a first embodiment of the present invention.

This mobile communication system adopts a CDMA mobile communication system, as a radio access system, and includes base stations 3a and 3b, directly connected to a core network 1, a radio control station 2, connected to these base stations 3a and 3b, and a mobile station 5, performing a radio communication with either the base station 3a or the base station 3b. FIG. 1 shows a state in which there is one mobile station 5 in a radio jurisdiction 4a supervised by the base station 3a. Although only two base stations are shown in FIG. 1, there may be three or more base stations. In similar manner, although there is provided only one radio jurisdiction supervised by each base station, plural radio jurisdictions may also be supervised by one base station. In addition, there may be plural mobile station 5 belonging to each radio jurisdiction.

The base stations 3a and 3b are of the same configuration and supervise the radio jurisdictions 4a and 4b, respectively, and hence are able to perform radio communication with the mobile station 5 in the relevant radio jurisdictions. In these wireless sections, that is, the radio jurisdictions, there is a downlink from the base station side towards the mobile station 5 and an uplink from the mobile station 5 to the base station side. The state of congestion or non-congestion on the uplink or that on the downlink is represented by a first state indicator.

The core network 1 is wire connected to the base stations 3a and 3b. In the wire section, there are provided a downlink along which the communication traffic flows from the core network 1 towards the base station and an uplink along which the communication traffic flows from the base station towards the core network 1. The state of congestion or non-congestion on the uplink or that on the downlink is represented by a second state indicator.

The mobile station 5 measures the communication traffic from it to send the measured results to the radio control station 2 as the state of the communication traffic flowing in the uplink of the wire section. In making connection to the base station, the mobile station 5 sends a line connection request to the radio control station 2.

The radio control station 2 controls the setup of the radio link in the base stations 3a and 3b to the mobile station. The radio control station receives a request for line connection from the mobile station 5, as well as the state of communication traffic on the uplink of the wire section, while exchanging control signals with the base stations 3a and 3b to perform acceptance control for the line connection request from the mobile station 5.

The radio control station 2 and the base stations 3a and 3b include the functions necessary for line acceptance control.

The line acceptance control functions of the radio control station and the base stations will now be described specifically. First, the line acceptance control functions of the base stations 3a and 3b will be described. Since the base stations 3a and 3b are of the same configuration, the base station 3a is taken as an example and the line acceptance control function thereof will be specifically described.

Figure 2:
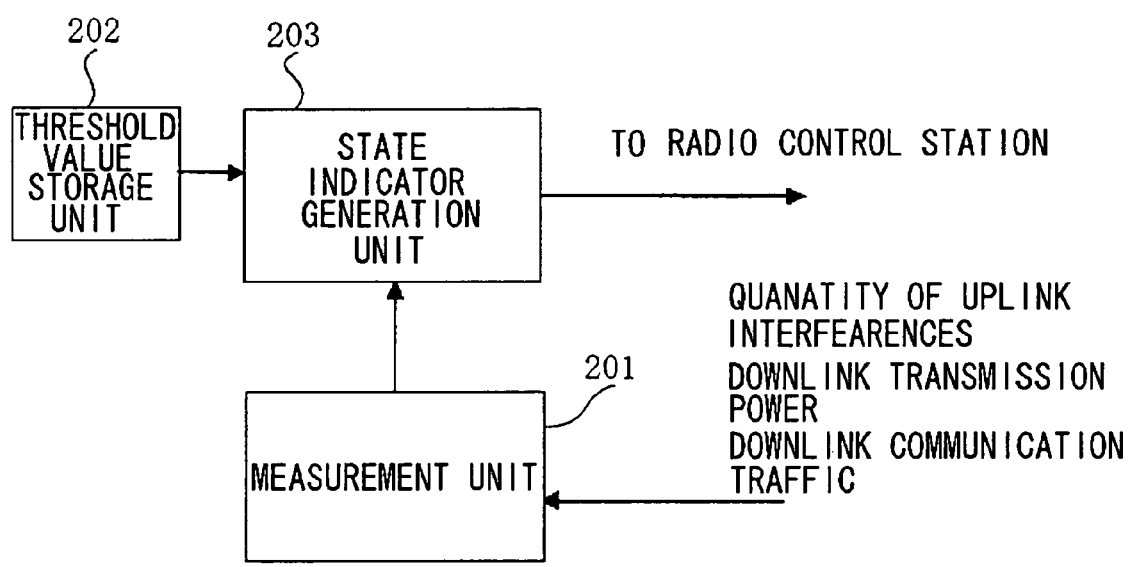
FIG. 2 is a block diagram showing a principal configuration of a base station shown in FIG. 1.

FIG. 2 shows a principal configuration of the line acceptance control unit of the base station 3a. This line acceptance control unit is made up by a measurement unit 201, a threshold value storage unit 202 and a state indicator generation unit 203.

The measurement unit 201 incessantly measures the quantity of uplink interferences, approximated by the total received power in the spread band in the uplink of the wireless section (radio link) for the radio jurisdiction 4a, and the quantity of the transmission power, as the total transmission power in the downlink. The measurement unit 201 also measures the communication traffic, transmitted from the core network 1 by the downlink of the wire section across the base station 3a and the core network 1, for each of the links allocated to the mobile station 5 present in the radio jurisdiction 4a. The measured results of the quantity of interferences of the uplink as well as the transmission power of the downlink in the wireless section and the measured results of the communication traffic in the downlink of the wire section, are sent to the state indicator generation unit 203.

In the threshold value storage unit 202, there are pre-set a 'threshold value 1' and a 'threshold value 2' (with the threshold value 1>threshold value 2) for each of the measured values obtained by the measurement unit 201, that is, measured values of the quantity of interferences on the uplink and the transmission power of the downlink in the wireless section and the communication traffic of the downlink in the wire section). In this case, the values of the 'threshold value 1' and the 'threshold value 2' are distinctly set to optimum values for each of the quantities of interferences of the uplink, the transmission power of the downlink and the communication traffic of the downlink.

The state indicator generation unit 203 compares the measured values, obtained by the measurement unit 201, with the threshold values as set in the threshold value storage unit 202, to decide whether the uplink and downlink of the wireless section and the downlink of the wire section are each in the non-congested state or in the congested state. The state indicator generation unit 203 also generates a first state indicator, showing the result of decision on the uplink and downlink of the wireless section, and a second state indicator, showing the result of decision on the downlink of the wire section, and sends the so produced state indicators to the radio control station 2. In transmitting the second state indicator, the state indicator generation unit 203 also sends the state (quantity) of the communication traffic on the downlink of the wire section to the radio control station 2.

Figure 3:
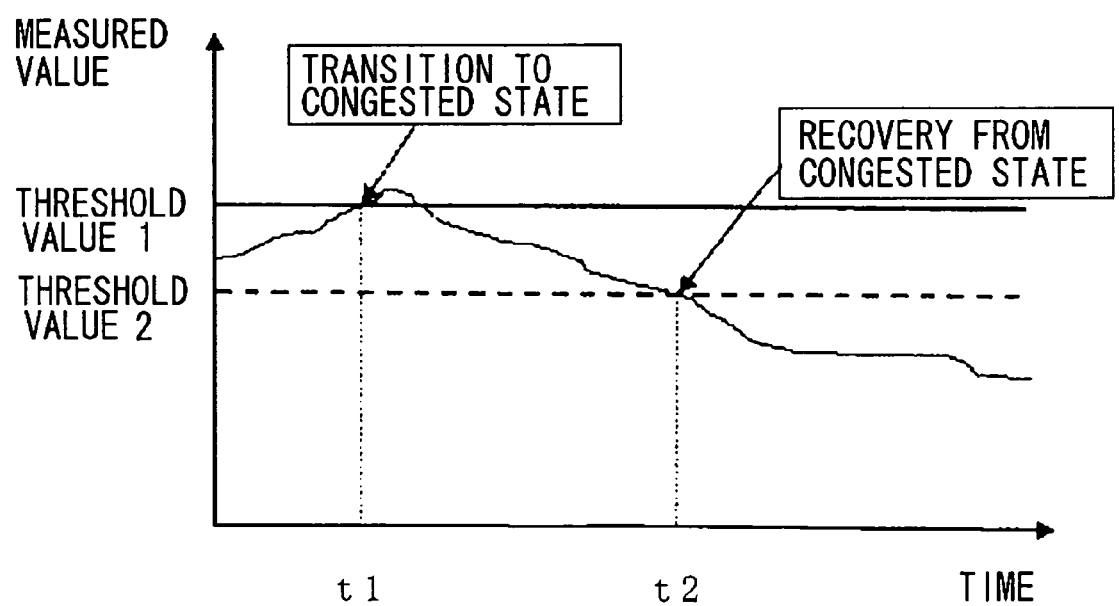
FIG. 3 is a graph showing a typical relationship between changes in measured values with lapse of time on one hand and a 'threshold value 1' and a 'threshold value 2' on the other hand.

The graph of FIG. 3 shows the illustrative relationship between the changes in the measured values with lapse of time on one hand and the 'threshold value 1' and the 'threshold value 2' on the other hand. These measured values are those of any one or more of the quantities of interferences of the uplink and the transmission power of the downlinks of the wireless section and the communication traffic of the downlink of the wire section. The non-congested state is defined by the measured value being equal to or lesser than the 'threshold value 1'.

The non-congested state prevails until time t1. In this non-congested state, a radio link may be set e.g. across the base station 3a and the mobile station 5, and the user may exploit communication services, such as those of the stationary phone or mobile phone. If, at the time t1, the measured value exceeds the 'threshold value 1' (state transition), the base station 3a deems that the state of congestion has been entered on the uplink or downlink of the wireless section or on the downlink of the wire section. Thus, the state indicator generation unit 203 generates the first or second state indicator, showing the congested state, and sends the so generated state indicator to the radio control station 2. The base station 3a performs the processing for recovery from the congested state. For example if the radio jurisdiction 4a is in the congested state, the base station 3a proceeds to decrease the communication speed stepwise, beginning from the user exploiting high-speed communication services, such as packet communication, thereby lowering the communication load, for restoration from the congested state.

When the measured value is decreased to the 'threshold value 2', defined as hysteresis, the base station 3a deems that recovery has been made from the congested state. The state indicator generation unit 203 then generates the first or second state indicator, representing the non-congested state, to send the so produced state indicator to the radio control station 2.

Figure 4:
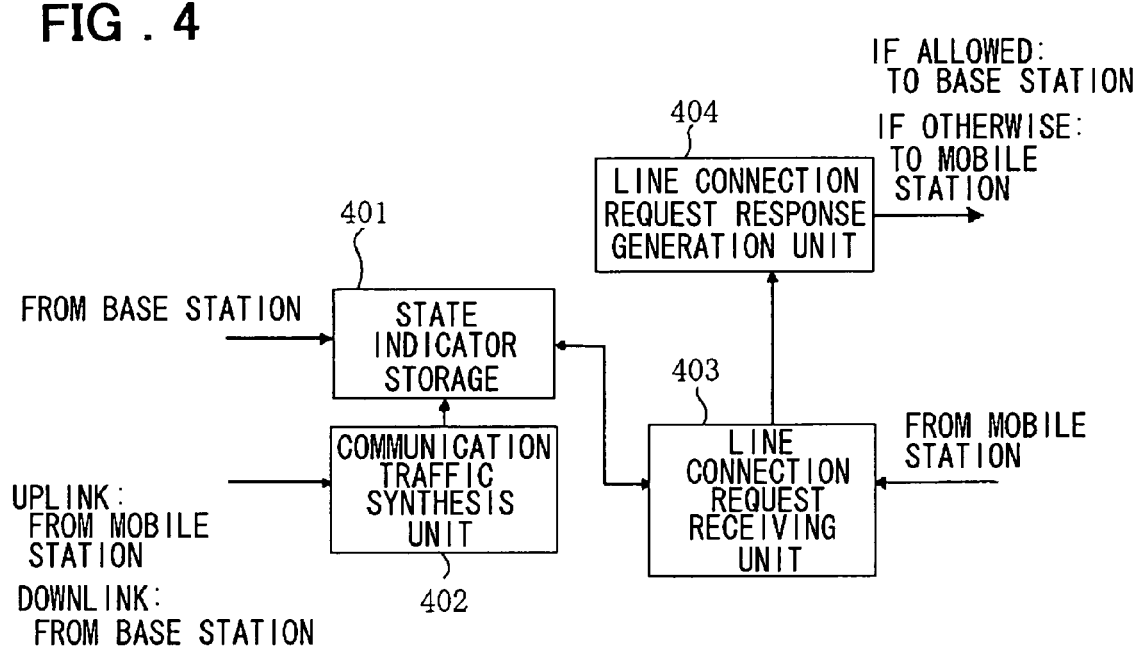
FIG. 4 is a block diagram showing the principal configuration of a radio control station shown in FIG. 1.

The line acceptance control function of the radio control station 2 will now be described. FIG. 4 shows the schematic configuration of the line acceptance control unit of the radio control station 2. This line acceptance control unit includes a state indicator storage 401, a communication traffic synthesis unit 402, a line connection request receiving unit 403 and a line connection request response generation unit 404.

The state indicator storage 401 receives, from the base stations 3a and 3b, a first state indicator indicating whether the radio jurisdictions 4a and 4b under their control are in the non-congested state or in the congested state, and causes the received results to be stored from one radio jurisdiction to another. The state indicator storage 401 also receives, from the base stations 3a and 3b, a second state indicator indicating whether the downlink of the wire section is in the non-congested state or in the congested state, and causes the received results to be stored from one base station to another.

The communication traffic synthesis unit 402 receives, from the base stations 3a and 3b, the state (quantity) of the communication traffic of the downlink of the wire section, while also receiving, from the mobile station 5, the state (quantity) of the communication traffic of the uplink of the wire section.

The communication traffic synthesis unit 402 also synthesizes the states (quantities) of the communication traffic, received from the base stations, to calculate the quantity of the entire communication traffic on the downlink of the wire section, and compares the calculated results to a preset overall tolerance A of the downlink of the wire section. The communication traffic synthesis unit assumes the state of traffic lower than the tolerance A and that exceeding the tolerance A to be the non-congested state and the congested state, respectively, and causes the state of comparison to be stored in the state indicator storage 401. The communication traffic synthesis unit 402 also synthesizes the quantities of the communication traffic, received from the respective mobile station 5, from one base station to the next, and compares the quantities of the communication traffic, synthesized from one base station to the next, to a tolerance B1, pre-allocated to each base station in connection with the uplink of the wire section. The communication traffic synthesis unit assumes the state of traffic lower than the tolerance B1 and that exceeding the tolerance B1 to be the non-congested state and the congested state, respectively, and causes the state of comparison to be stored in the state indicator storage 401. The communication traffic synthesis unit 402 further synthesizes the traffic (quantity of traffic), synthesized from one base station to the next, to calculate the quantity of the entire communication traffic flowing through the uplink of the wire section. The communication traffic synthesis unit then compares the calculated results to a preset entire tolerance B2 of the uplink of the wire section. The communication traffic synthesis unit assumes the state of traffic lower than the tolerance B2 and that exceeding the tolerance B2 to be the non-congested state and the congested state, respectively, and causes the state of comparison to be stored in the state indicator storage 401.

On receipt of the line connection request from the mobile station 5, the line connection request receiving unit 403 refers to the state of congestion of the base station supervising the radio jurisdiction in charge of the mobile station of interest, stored in the state indicator storage 401, and to the overall state of congestion of the uplink and downlink of the wire section, to verify whether or not the line connection request is to be allowed. The verified results are sent to the line connection request response generation unit 404.

On receipt of an input from the line connection request receiving unit 403 to the effect that the line connection request shall be allowed, the line connection request response generation unit 404 sends a control signal for setting up the radio link to the base station and, on receipt of an input from the line connection request receiving unit 403 to the effect that the line connection request shall not be allowed, the line connection request response generation unit 404 sends a control signal to the mobile station 5 to the effect that the line connection request shall not be allowed, without sending the control signal for setting up the radio link to the base station.

The access acceptance control, performed in the mobile communication system of the present embodiment will now be described.

The congestion may be classed into the congestion in the base station, taking charge of the radio jurisdiction, the mobile station belongs to, and that in the uplink and downlink of the wire section in their entirety. The former congestion type is produced when many mobile stations have been connected to a sole base station, whilst the latter congestion type is produced when the overall number of the mobile stations connected to the respective base stations is increased. In the mobile communication system of the present embodiment, the radio control station 2 is able to grasp the state of occurrence of both congestion types, by having reference to the first and second state indicators, stored in the state indicator storage 401, and to the results of comparison by the communication traffic synthesis unit 402. In case the state of congestion persists, the control signal for setting the radio link is not sent to the base station even on receipt of the line connection request from the mobile stations. The former type of congestion, which is especially of a problem in the practical use, will now be described.

Figure 5:
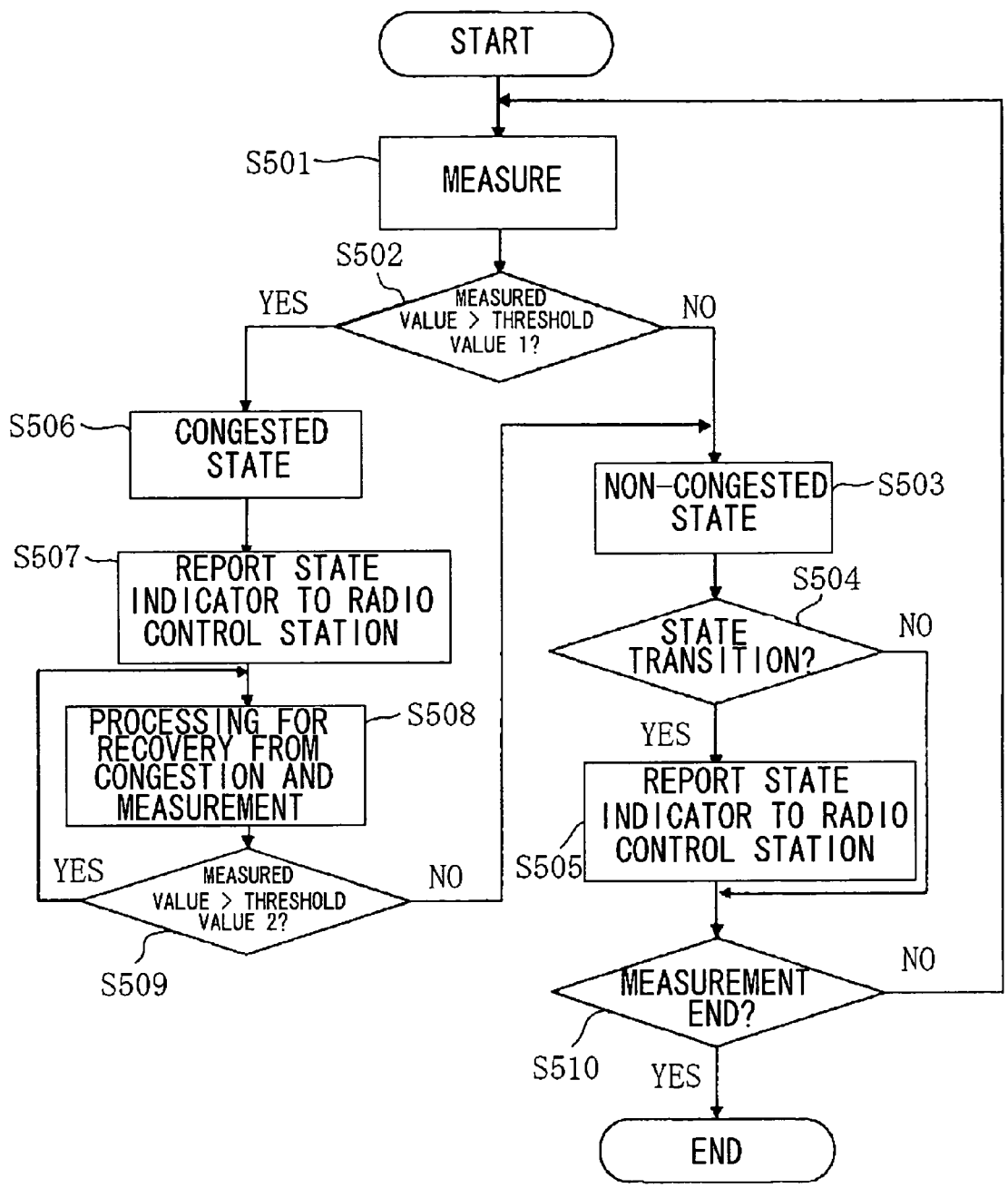
FIG. 5 is a flowchart for illustrating the operation of a base station in the mobile communication system shown in FIG. 1.

First, the monitoring of the state of congestion is described. FIG. 5 shows the sequence of operations in monitoring the state of congestion in the base station 3a. In monitoring the state of congestion, the quantity of interferences in the uplink, transmission power in the downlink and the communication traffic in the downlink are incessantly measured (step S501). Each measured value is compared to the preset 'threshold value 1' (step S502). If, in this comparison, the measure value is not larger than the 'threshold value 1', the non-congested state is deemed to prevail (step S503). It is then checked whether or not the non-congested state is the result of state transition from the congested state (step S504). Since the non-congested state in this case is not the result of state transition from the congested state, the result of the check is 'NO'. It is then checked whether or not the measurement is to be terminated (step S510). If the measurement is to be terminated, the processing for the present sequence of operations is terminated. If the measurement is to be continued, processing reverts to the step S501.

If, in the comparison in the step S502, the measured value has exceeded the 'threshold value 1', the congested state is deemed to prevail (step S506), and the first or second state indicator, representing the state of congestion, is reported to the radio control station 2 (step S507). The processing for recovery from the congested state is then carried out until the measured value is not larger than the 'threshold value 2' (steps S508 and S509). When the measured value is not larger than the 'threshold value 2', processing transfers to the above step S503, where the non-congested state is deemed to prevail. It is checked, in the above step S504, whether or not the non-congested state is the result of state transition from the congested state. Since the present state is the result of state transition from the congested state, the result of check of the step S504 is 'YES', so that report is made of the first or second state indicator, representing the non-congested state (step S505). The decision is then made of the above step S510.

Figure 6:
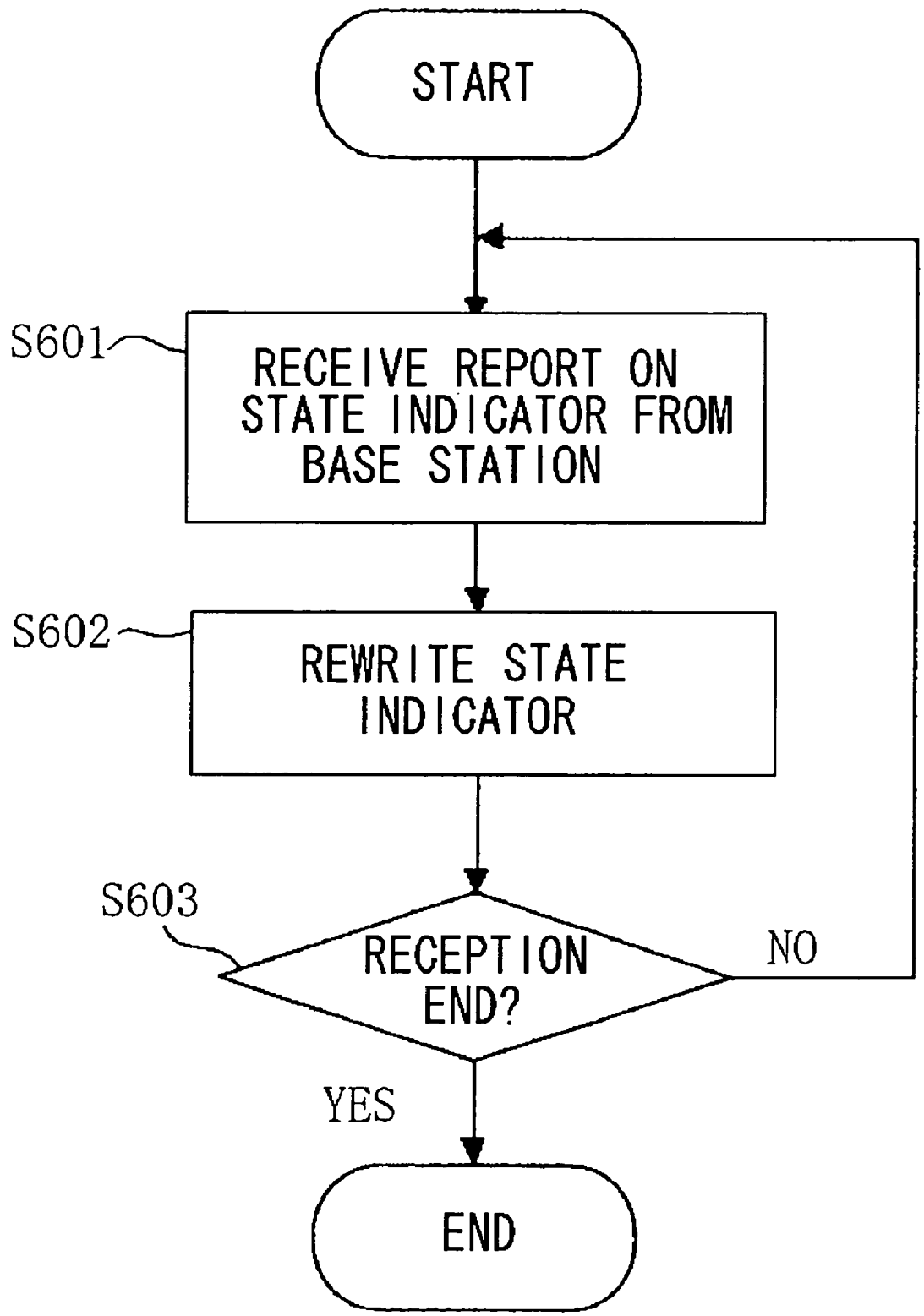
FIG. 6 is a flowchart for illustrating the operation of a radio control station in the mobile communication system shown in FIG. 1.

The storage of the state indicator will now be described. FIG. 6 shows the sequence of operations for storing the state indicators in the radio control station 2. The first or second state indicator is incidentally received from the base station 3a or 3b (step S601). The so received state indicator is stored on the radio jurisdiction basis or on the base station basis, insofar as the wireless section or the wire section is concerned, respectively (step S602). This storage of the state indicator is repeated each time the state indicator is sent (step S603).

The operation of the acceptance control for the congested state and that for the non-congested state will now be described separately in detail.

(1) Non-congested State

Figure 7:
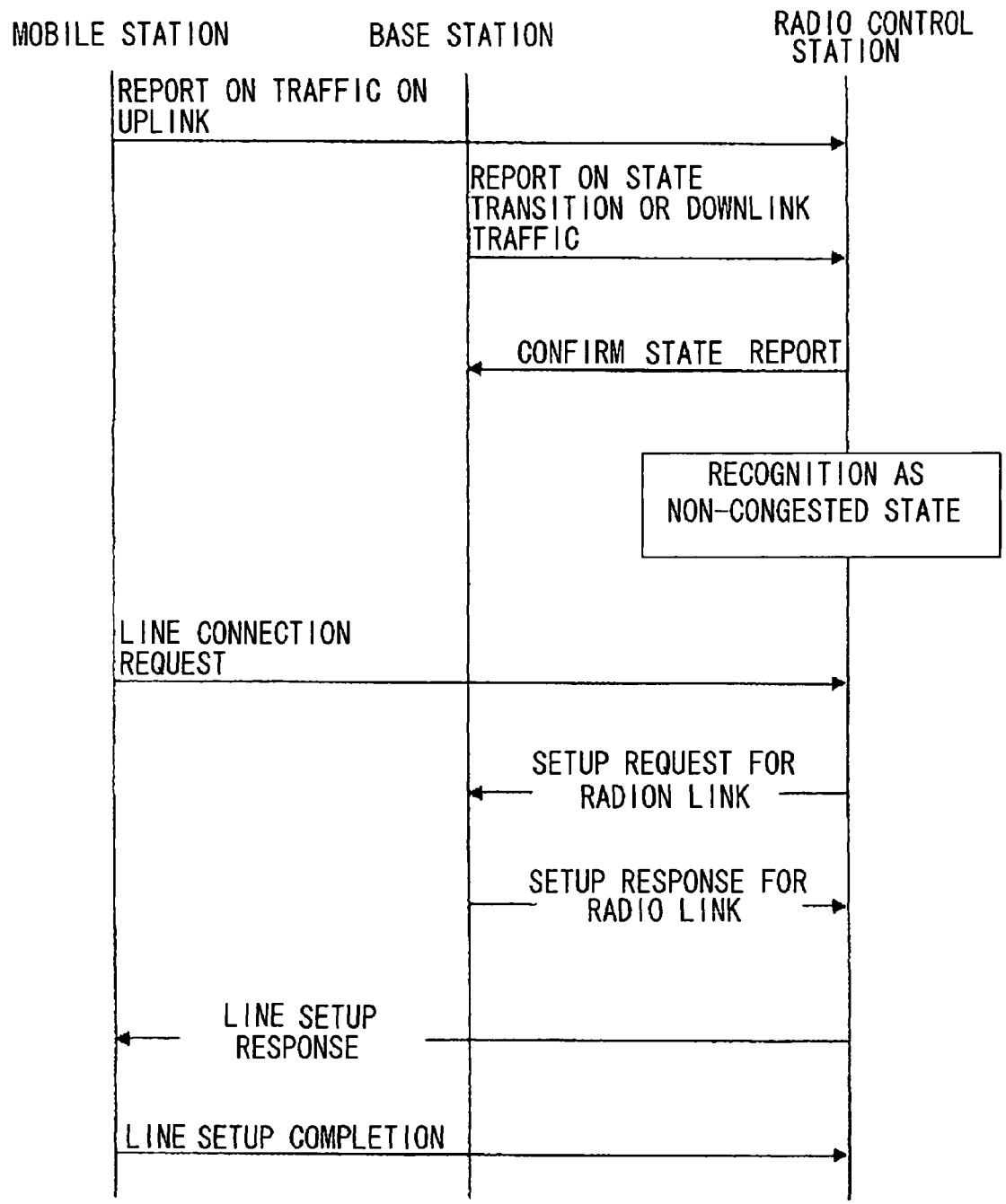
FIG. 7 illustrates an acceptance control operation in a non-congested state of the mobile communication system shown in FIG. 1.

FIG. 7 shows the operation for acceptance control in the non-congested state. In the present instance, there is shown the exchange of control signals between the radio control station 2, base station 3a and the mobile station 5, in case the radio jurisdiction 4a and the wire section are in the non-congested state.

The base station 3a reports the first or second state indicator, representing the non-congested state, to the radio control station 2, while simultaneously reporting the state of the communication traffic of the downlink to the radio control station 2. In the case shown in FIG. 7, the two reports are represented by the same control signal, only for convenience sake. However, these reports are produced at the time point of occurrence of state transition and hence are not necessarily made at the same time point.

On the other hand, the mobile station 5 reports the second state indicator, representing the state of communication traffic of the uplink, to the radio control station 2.

The radio control station 2 sends, for confirmation, a confirmation signal for the state report to the base station 3a, lest the state in the radio jurisdiction, received from the base station 3a, should be recognized in a mistaken fashion. If the base station 3a has received a state report different from the previously reported state information, the state information, previously transmitted, is again transmitted to the radio control station 2. In this manner, the radio control station 2 comes to recognize that the radio jurisdiction 4a is in the non-congested state, based on the state report or the second state report from the base station 3a. The radio control station 2 also determines, from the state of the communication traffic of the downlink, received from the base station 3a, and from the state of the communication traffic of the uplink, received from the mobile station 5, that no congestion is occurring, also in the wire section.

If, in a state the above decision has been given, that is, in case it has been recognized that the radio jurisdiction 4a is in the non-congested state, and the radio link can be established, the radio control station 2 has received the line connection request from the mobile station 5, the radio control station sends the information for setting up the radio link to the base station 3a. On receipt of the information for setting up the radio link, the base station 3a sets up a radio link, satisfying the request, and subsequently returns a response to the radio control station 2. On receipt from the base station 3a of the response that the radio link has been set up, the radio control station 2 returns to the mobile station 5 the response to the effect that a link has been set to the previous line connection request. On receipt the link setup response from the radio control station 2, the mobile station 5 completes the own link setup and sends the results to the radio control station 2. The next following operations are not described herein because these operations are similar to those in the well-known mobile communication and hence are irrelevant to the present invention.

(2) Congested State

Figure 8:
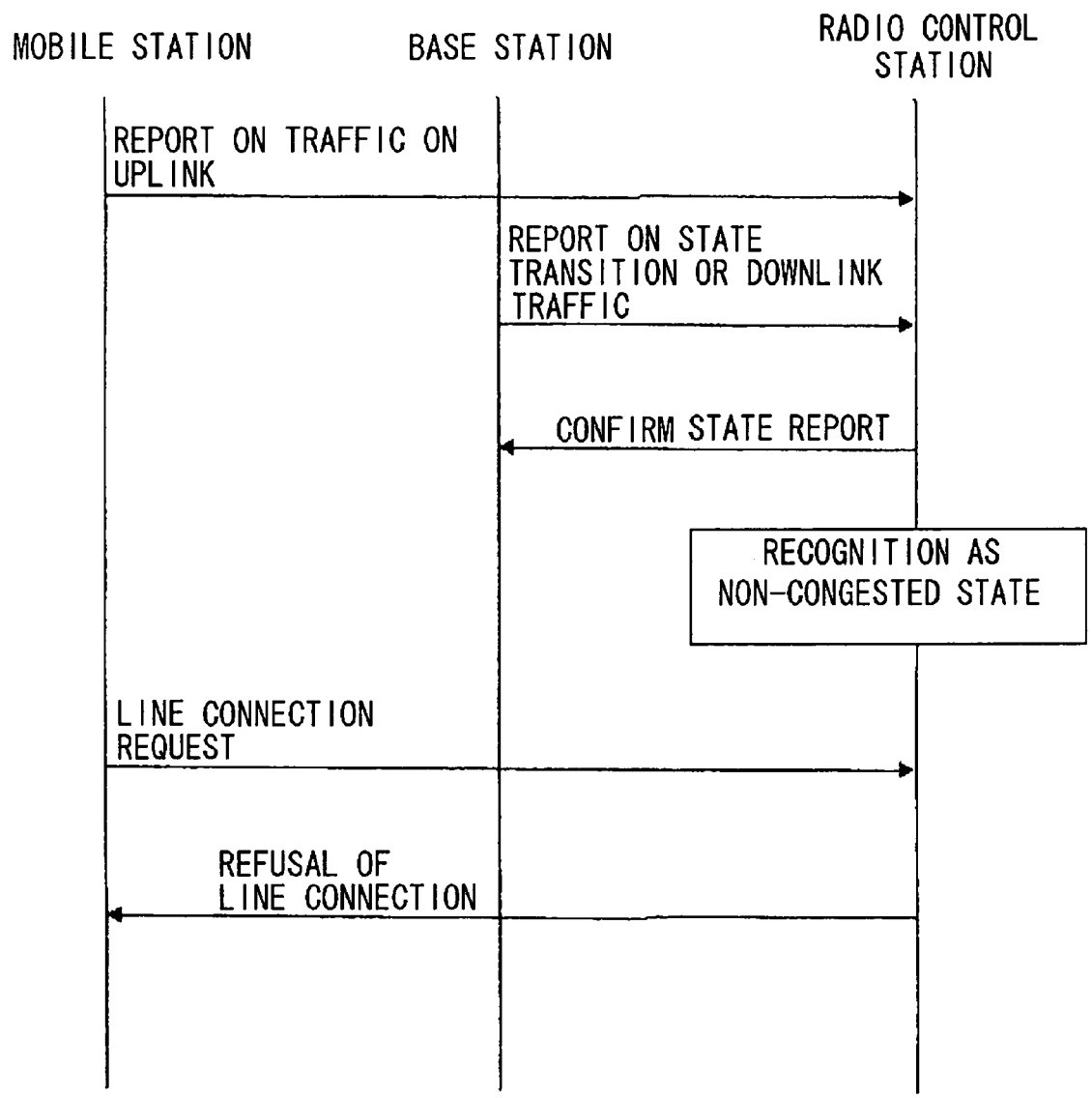
FIG. 8 illustrates an acceptance control operation in a congested state of the mobile communication system shown in FIG. 1.

FIG. 8 shows the operation for acceptance control in the congested state. In the present instance, there is shown the exchange of control signals between the radio control station 2, base station 3a and the mobile station 5 in case one or both of the radio jurisdiction 4a and the wire section is in the congested state.

The base station 3a reports the first or second state indicator, representing the congested state, to the radio control station 2, while simultaneously reporting the state of the communication traffic of the downlink, to the radio control station. In the case shown in FIG. 8, the two reports are represented by the same control signal, only for convenience sake. However, these reports are produced at the time point of occurrence of state transition and hence are not necessarily made at the same time point. On the other hand, the mobile station 5 reports the second state indicator, representing the state of communication traffic of the uplink, to the radio control station 2. Here again, the processing for state recognition, similar to that for the above-described case of non-congestion, is carried out between the radio control station 2 and the base station 3a.

After state confirmation, the radio control station 2 recognizes that the radio jurisdiction 4a is in the congested state, based on the state report or the second state report from the base station 3a. Or, the radio control station 2 recognizes, from the state of the communication traffic of the downlink, received from the base station 3a, and from the state of the communication traffic of the uplink, received from mobile station 5, that the wire section suffers from congestion. In this manner, the radio control station 2 recognizes that at least one of the wireless section and the wire section is suffering from congestion.

If, as the radio control station 2 recognizes that at least one of the wireless section and the wire section is suffering from congestion, the radio control station has received a line connection request from the mobile station 5, the radio control station instantly sends a control signal stating that the line connection request is refused, without sending the information for radio link setting to the mobile station 5.

With the above-described acceptance control under the congested state, in which the base station gives an advance notice of the congested state in the wireless section or in the wire section to the radio control station, the processing for radio link setting in the radio control station may be dispensed with to relieve transmission/reception of unneeded control signals between the base station and the radio control station.

Second Embodiment

The mobile communication system according to a second embodiment of the present invention will now be described. The mobile communication system according to the present second embodiment corresponds to the system shown in FIG. 1 having the configuration of the line acceptance control functions of the base station and the radio control station shown in FIGS. 2 and 4. However, the present second embodiment differs from the above-described first embodiment in that acceptance control is managed responsive to three states, namely a request accepting state, a handover accepting state and a block state. The present second embodiment is similar to the above-described first embodiment as to the method for measuring the communication traffic and reporting to the radio control station, state storage in the radio control station and as to the synthesis of communication traffic of the uplink and downlink. Thus, the corresponding explanation for the operations is omitted and only the points of difference from the first embodiment are described in detail.

As for the line connection requests from the mobile station 5, there are a new call, produced by call origination or call incoming, and a handover call, produced by handover from another radio jurisdiction. The former line connection request is termed a new line connection request and the latter is termed a handover connection request.

Figure 9:
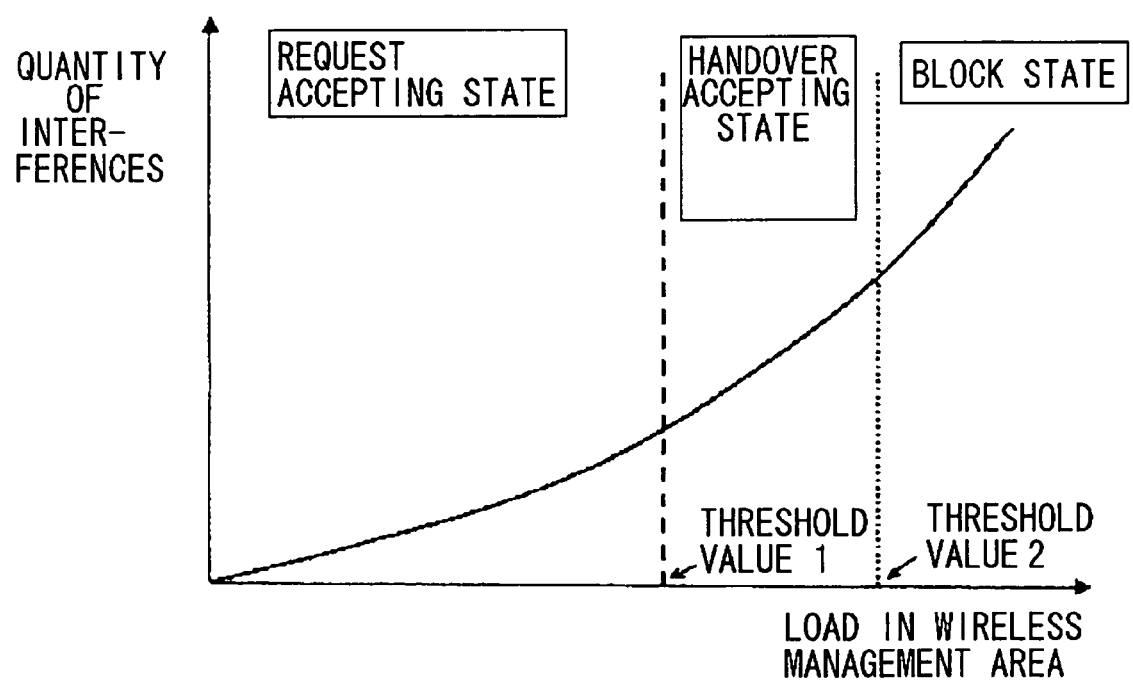
FIG. 9 is a graph schematically showing the relationship between a request accepting state, a handover accepting state and a block state.

FIG. 9 schematically shows the relationship between the request accepting state, handover acceptance state and the block state. In FIG. 9, the ordinate stands for the quantity of interferences in the base station 3a, corresponding to the quantity of interferences in the uplink and to the transmission power in the downlink. The abscissa stands for a load in the radio jurisdiction 4a, corresponding to the number of the currently set radio links. This load is measured by the base station 3a, for each of the uplink and the downlink, each time a wireless circuit is added or subtracted. The 'threshold value 1' and the 'threshold value 2', where the 'threshold value 1'<the 'threshold value 2', prescribes the boundary for each of the request accepting state, handover acceptance state and the block state, and may optionally be set, depending on design parameters.

The state of the load on the uplink and downlink being not larger than the 'threshold value 1' is defined as the request accepting state. In this request accepting state, a new line connection request and a handover connection request are both allowed for connection, such that communication services may be utilized in the usual manner (condition 1).

The state of the load on one of the uplink and the downlink not being larger than the 'threshold value 1', with the load on the other link being larger than the 'threshold value 1'and not larger than 'threshold value 2', is termed a handover accepting state. In this handover accepting state, no new line connection request is allowable. However, a handover connection request is allowed, in order to prevent the communication quality from being deteriorated due to line disconnection caused by migration of the mobile station across different radio jurisdictions (condition 2).

The state in which the load on one of the uplink and the downlink exceeds the 'threshold value 2' is defined as the block state. In the block state, both the new line connection request and the handover connection request are rejected for maintaining the communication quality (condition 3).

The base station 3a produces a third state indicator, representing which of the above-mentioned three states is the current state of the radio jurisdiction 4a, and sends the so produced indicator to the radio control station 2 with state transition. The base station 3b similarly produces a third state indicator and sends the so generated indicator to the radio control station 2.

The radio control station 2 stores the third state indicator, received from each base station, on the base station basis. Moreover, on receipt of a new line connection request or a handover connection request from the mobile station 5, the radio control station 2 refers to the so stored third state indicator, and decides which of the above-mentioned three states is the current state of the radio jurisdiction, the mobile station 5 belongs to, while determining whether or not the connection request is allowable, in accordance with the aforementioned three conditions.

The operation of the access accepting control, carried out in the mobile communication system of the present embodiment, will now be described in detail.

Figure 10:
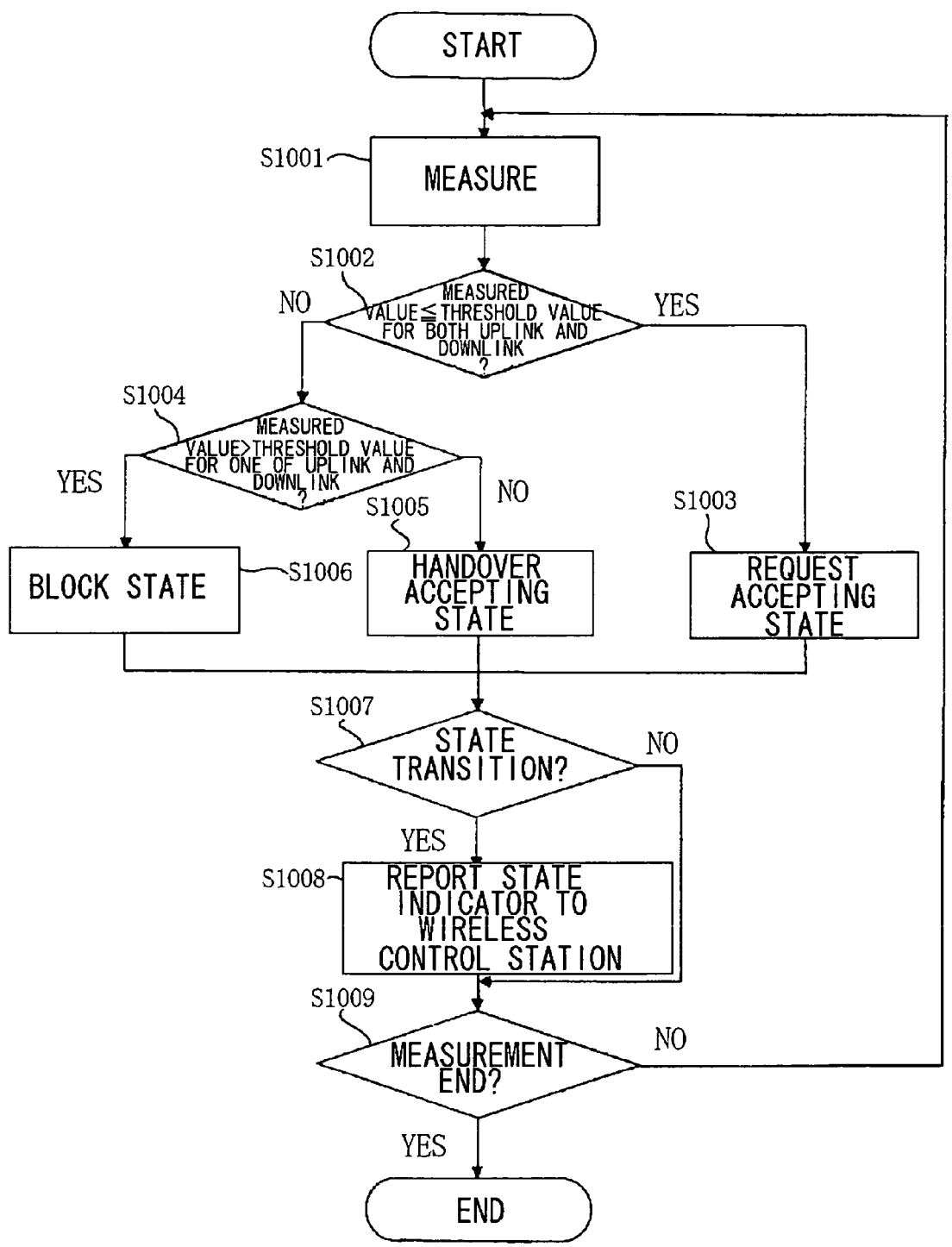
FIG. 10 is a flowchart for illustrating the operation of a base station in the mobile communication system according to a second embodiment of the present invention.

FIG. 10 shows the operation of monitoring the state of congestion in the base station 3a. First, in monitoring the state of congestion, the load on the wireless section is found, each time the radio link is added or subtracted, for each of the uplink and the downlink (step S1001). In the next following explanation, the load on the uplink and that on the downlink are termed a first load and a second load, respectively. It is then checked whether or not the both first and second loads, as found in the above step S1001, are equal to or lesser than the 'threshold value 1' (step S1002). If the result of this decision is 'YES', the prevailing state is determined to be the request accepting state (step S1003). If the result of this decision is 'NO', it is checked whether or not the first or second load exceeds the 'threshold value 2' (step S1004). If the result of the decision is 'YES', the prevailing state is deemed to be the block state. If the result of the decision is 'NO', the prevailing state is deemed to be the handover accepting state.

It is then checked whether or not the state deemed after passing through any of the above steps S1003, S1005 and S1006 is the state transitioned from another state (step S1007). For example, if the state deemed in the step S1003 is the request accepting state, it is checked in the step S1007, whether or not the request accepting state is the state transitioned from another state (block state or handover accepting state).

If the result of decision in the above step S1007 is 'YES', a third state indicator, representing the deemed state, is generated and reported to the radio control station 2 (step S1008). For example, if the state deemed in the step S1003 is the request accepting state, the third state indicator, representing the request accepting state, is produced in the step S1008.

After sending the third state indicator, it is checked whether or not the measurement is to be terminated (step S1009). When the measurement is to be terminated, the processing of the above-described operations is terminated. When the measurement is to be continued, processing reverts to the step S1001.

If the result of check in the above step S1007 is 'NO', processing directly transfers to the above step S1009.

The operations of the acceptance control will be described in detail for each of the three acceptance control species, namely the request accepting state, handover accepting state and the block state.

(1) Request Accepting State

Figure 11:
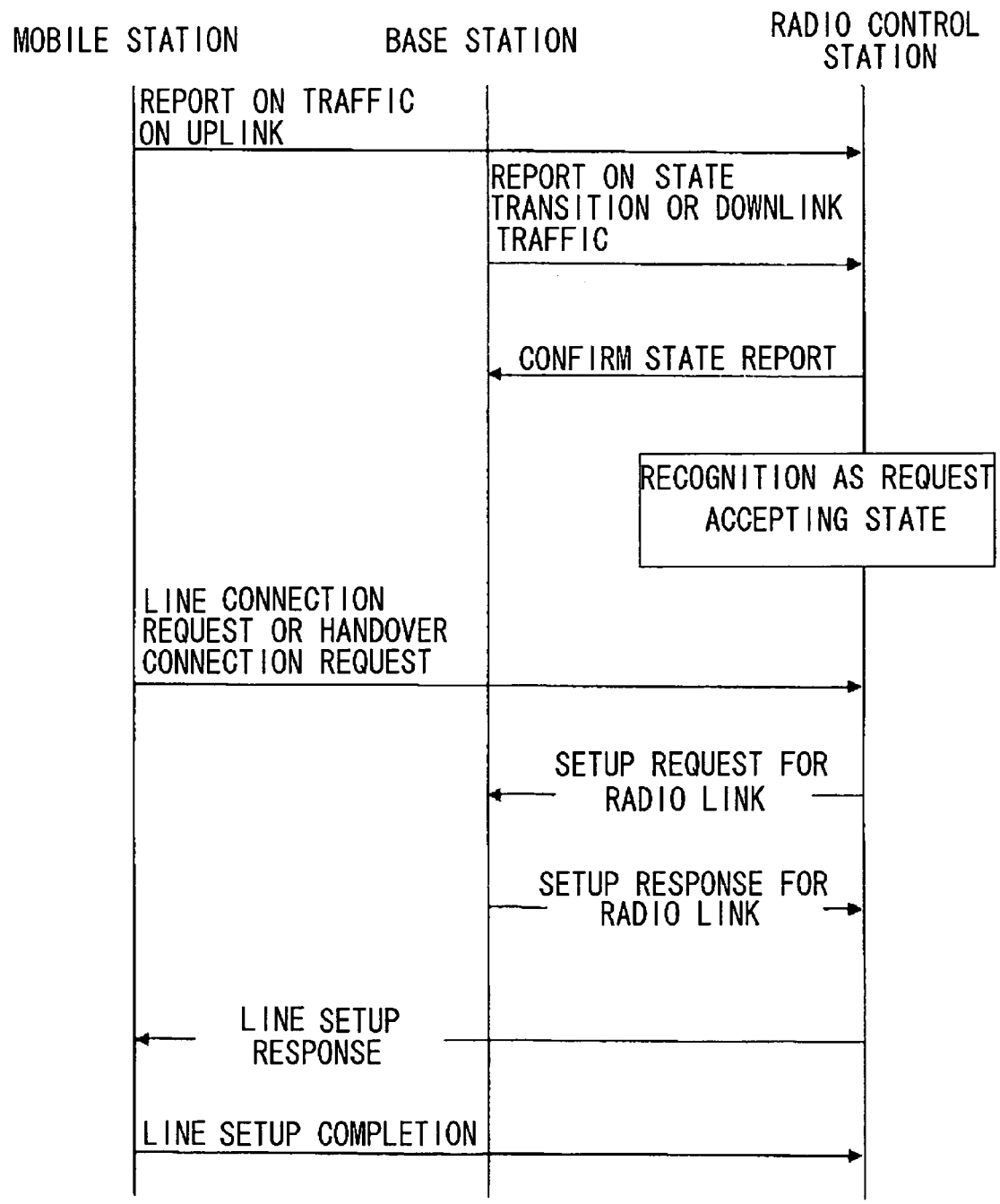
FIG. 11 illustrates the acceptance control in case the prevailing state is recognized to be a request accepting state in the mobile communication system according to the second embodiment of the present invention.

FIG. 11 shows the operations for acceptance control in case the prevailing state is the request accepting state. Specifically, there is shown the exchange of control signals in the radio control station 2, base station 3a and in the mobile station 5 for such a case where the radio jurisdiction 4a is in the request accepting state and where the wire section is in the no-congested state.

The base station 3a reports the third state indicator, representing the request accepting state, to the radio control station 2, while simultaneously reporting the state of communication traffic of the downlink. Since the report of the third state indicator and the communication traffic is made with state transition, the sequence of operations is not necessarily that as shown in FIG. 11. On the other hand, the mobile station 5 reports the state of the communication traffic of the uplink to the radio control station 2.

The radio control station 2 sends a signal for confirming the state report to the base station 3a, for confirmation, that is, lest the state in the radio jurisdiction 4a, as received from the base station 3a, should be recognized in a mistaken manner. If the state report, received by the base station 3a, differs from the state information, transmitted previously, the base station 3a again transmits the previously transmitted state information to the radio control station 2. Based on the state report or the second state report from the base station 3a, the radio control station 2 recognizes that the radio jurisdiction 4a is in the request accepting state. Moreover, from the state of the communication traffic of the downlink, received from the base station 3a, and the state of the communication traffic of the uplink, received from the mobile station 5, the radio control station 2 gives a decision that the wire section is also not suffering from congestion.

If, when the above decision has been given, that is, when the radio jurisdiction 4a is in the request accepting state, and it is recognized that the radio link can be set, the radio control station 2 has received a new line connection request or a handover connection request from the mobile station 5, the radio control station sends the information for setting the radio link to the base station 3a. On receipt of the information for setting up the radio link, the base station 3a sets up the radio link, meeting the request, and subsequently returns the setup response to the radio control station 2. On receipt of the setup response for the radio link, from the base station 3a, the radio control station 2 returns to the mobile station 5 the link setup response for the previous new line connection request or to the previous handover connection request. The mobile station 5, which has received the link setup response from the radio control station 2, completes the link setup on the side of the base station itself, and sends the result to the radio control station 2.

The subsequent operations are the same as those of the well-known mobile communication outside the scope of the present invention and hence the corresponding explanation is omitted for simplicity.

(2) Handover Accepting State

Figure 12:
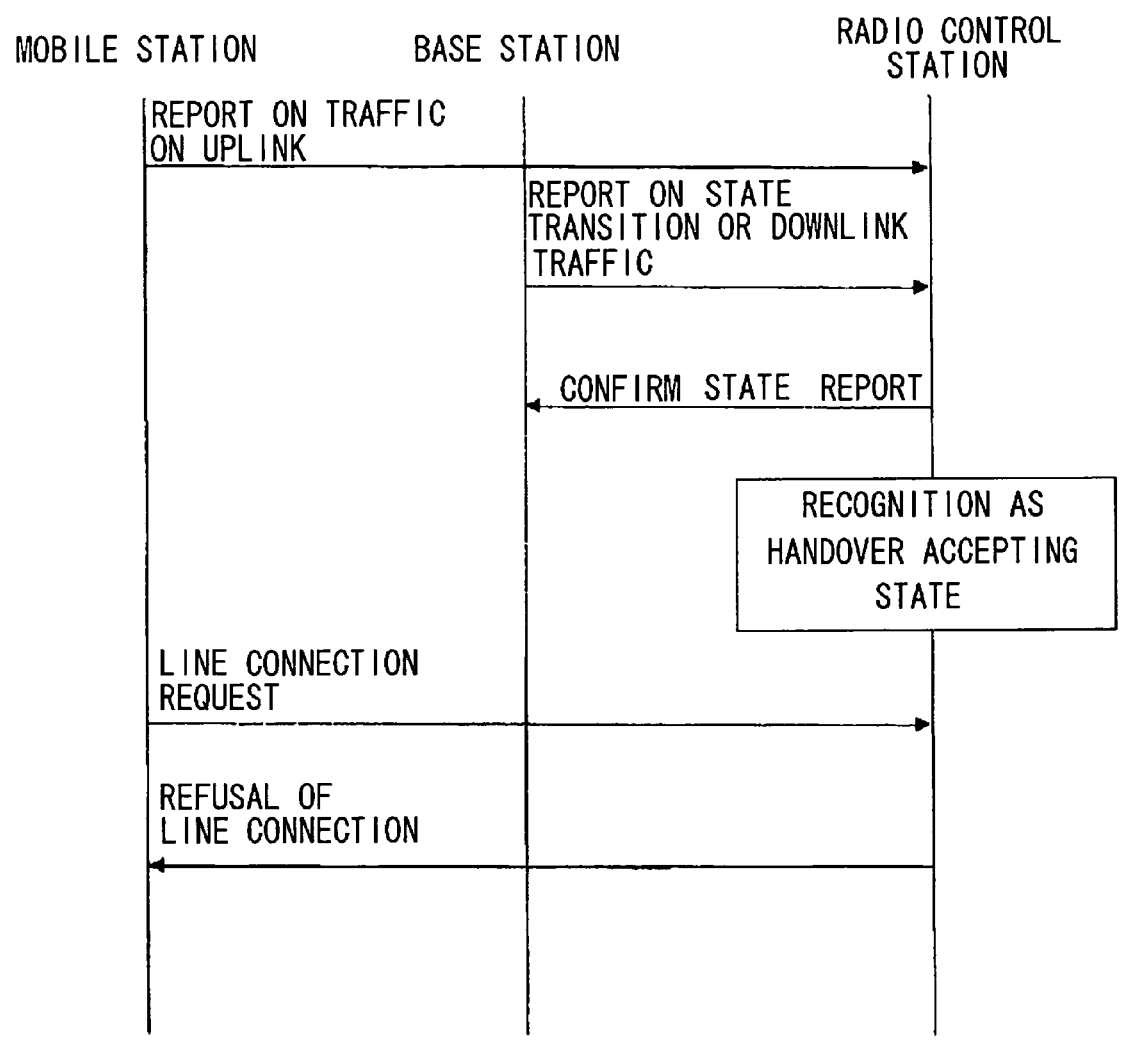
FIG. 12 illustrates the acceptance control in case the prevailing state is recognized to be a handover accept state in the mobile communication system according to the second embodiment of the present invention.

FIG. 12 shows the operations for the acceptance control in case the prevailing state is recognized to be the handover accepting state. Specifically, there is shown the exchange of control signals between the radio control station 2, base station 3a and the mobile station 5 in case the radio jurisdiction 4a is in the handover accepting state or in case the wire section is congested.

The base station 3a reports the third state indicator, representing the handover accepting state, to the radio control station 2, while simultaneously reporting the state of the communication traffic of the downlink. Since these report are made with state transition, the sequence of operations is not necessarily that as shown in FIG. 12. On the other hand, the mobile station 5 reports the state of the communication traffic of the uplink to the radio control station 2. Here again, the processing for state recognition, similar to that in case of the above-described request accepting state, is carried out between the radio control station 2 and the base station 3a.

Through the state report and the second state report from the base station 3a, the radio control station 2 recognizes that the radio jurisdiction 4a is in the handover accepting state. Or, from the state of the communication traffic of the downlink, received from the base station 3a, or from the state of the communication traffic of the uplink, received from the mobile station 5, the radio control station 2 recognizes that the wire section is suffering from congestion. If, in this state, the radio control station 2 has received a new line connection request or a handover connection request, from the mobile station 5, the radio control station 2 performs the following operations:

If the new line connection request is received, the radio control station 2 instantly sends a control signal stating that the line connection request is refused, without performing the processing for radio link setting or sending a control signal to the mobile station 5. In case the handover connection request has been received, the radio control station 2 sends the information for setting the radio link to the base station 3a, although the operation for this case is not shown in FIG. 12. As from this time, the processing which is the same as that for setting the radio link in the above-described request accepting state is performed.

(3) Block State

Figure 13:
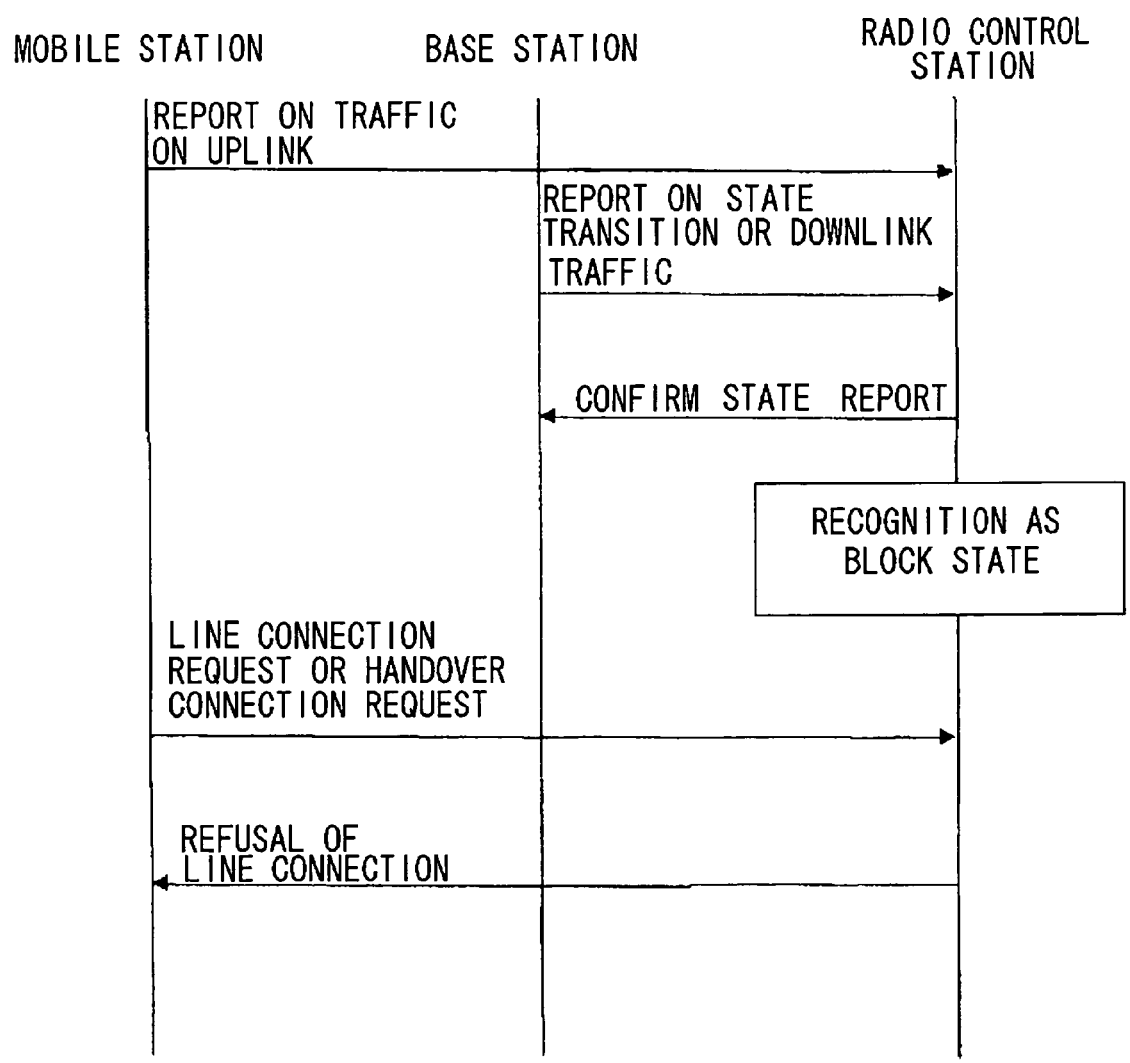
FIG. 13 illustrates the accept control in case the prevailing state is recognized to be a block state in the mobile communication system according to the second embodiment of the present invention.

FIG. 13 shows the operation of acceptance control in case the prevailing state is recognized to be the block state. Specifically, there is shown the exchange of signals between the radio control station 2, base station 3a and the mobile station 5 in case the radio jurisdiction 4a is in the blocked state, the wire section is congested or in case these two conditions are both met.

The base station 3a reports the third state indicator, representing the blocked state, while simultaneously reporting the state of the communication traffic on the downlink. Since these reports are made with the progress of the state transitions, the sequence of operations is not necessarily that as shown in FIG. 12. On the other hand, the mobile station 5 reports the state of the communication traffic of the uplink. Here again, the processing for state recognition, similar to that in case of the above-described request accepting state, is carried out between the radio control station 2 and the base station 3a.

Through the state report and the second state report from the base station 3a, the radio control station 2 recognizes that the radio jurisdiction 4a is in the block state. Or, from the state of the communication traffic of the downlink, received from the base station 3a, or from the state of the communication traffic of the uplink, received from the mobile station 5, the radio control station 2 recognizes that the wire section is suffering from congestion. In this manner, the radio control station 2 recognizes that at least one of the wireless section and the wire section is congested. If, in this state, the radio control station 2 receives a new line connection request or a handover connection request, from the mobile station 5, the radio control station instantly sends a control signal to the effect that the connection request shall be refused, to the mobile station 5, without performing the processing for setting a radio link or sending control signals to the base station.

With the above-described acceptance control, as with the first embodiment, previously described, unneeded control signals may be diminished. In addition, since the connection is allowable in case certain conditions relating to the handover connection request is met, communication services may be improved in quality.

Third Embodiment

Figure 14:
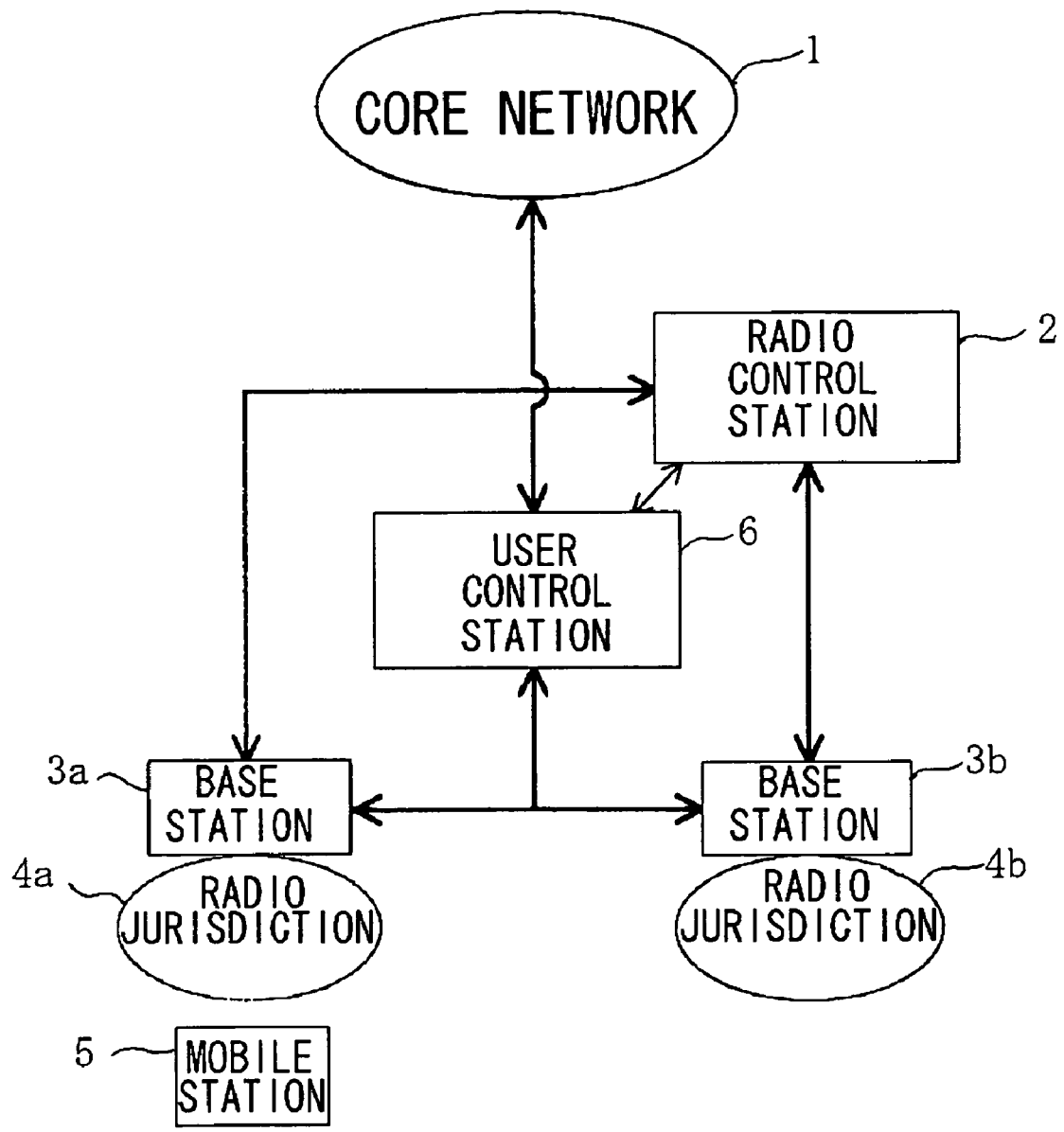
FIG. 14 is a block diagram showing a schematic configuration of a mobile communication system according to a third embodiment of the present invention.

FIG. 14 shows a schematic configuration of a mobile communication system according to a third embodiment of the present invention. This mobile communication system is basically the same as the system shown in FIG. 1 except that there is newly provided a user control station 6. Here, the same parts or components as those previously described are omitted and only parts or components characteristic of the present embodiment are described.

The user control station 6 relays between the base stations 3a and 3b and the core network 1, and is connected to the radio control station 2. The acceptance control operations, which are the same as those of the mobile communication system of the above-described first embodiment, are carried out by exchanging control signals between the radio control station 2, base stations 3a, 3b, mobile station 5 and the user control station 6.

Figure 15:
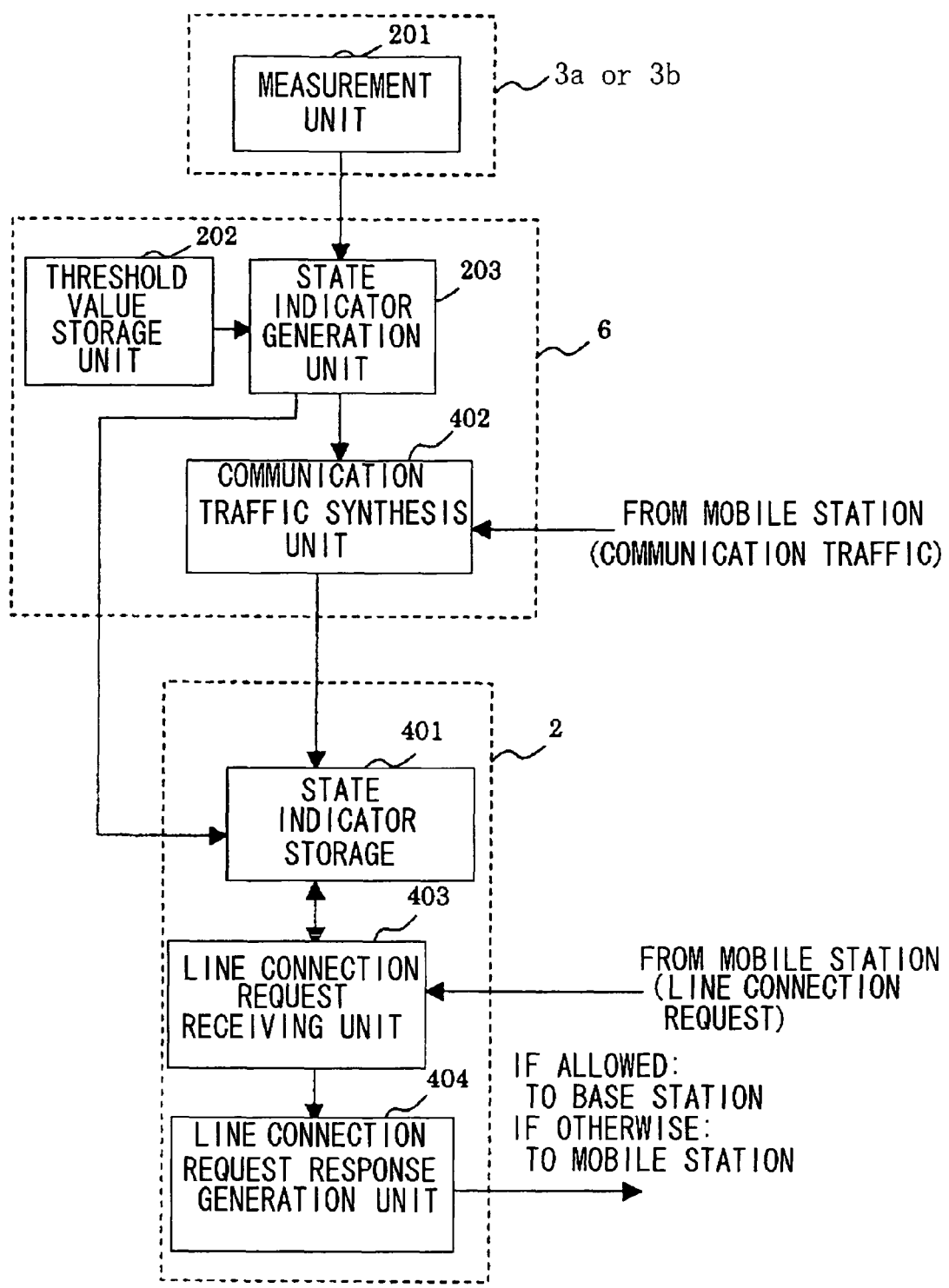
FIG. 15 is a block diagram showing a schematic configuration of a radio control station 2, a base station and a user control station shown in FIG. 14.

FIG. 15 shows a schematic configuration of line connection control units of the radio control station 2, base stations 3a and 3b, and the user control station 6. The base stations 3a and 3b each include a measurement unit 201 shown in FIG. 2. The user control station 6 includes the threshold value storage unit 202 and the state indicator generation unit 203, shown in FIG. 2, and the communication traffic synthesis unit 402, shown in FIG. 4. The radio control station 2 includes the state indicator storage 401, the line connection request receiving unit 403 and the line connection request response generation unit 404, shown in FIG. 4. The interconnection and the operations of the measurement unit 201, threshold value storage unit 202, state indicator generation unit 203, state indicator storage 401, communication traffic synthesis unit 402, line connection request receiving unit 403 and the line connection request response generation unit 404 are identical with those of the above-described first embodiment.

In the present embodiment, the user control station 6 periodically receives measured results from the base stations 3a and 3b and monitors whether or not the uplink and downlink in the wireless section and the downlink of the wire section are congested. Based on the results of the monitoring, the user control station produces first and second state indicators and sends the so generated state indicators to the radio control station 2 each time state transition occurs. The user control station 6 is also configured to receive measured results of the communication traffic, sent from each mobile station, as the state of the communication traffic flowing through the uplink of the wire section, from each mobile station 5. The user control station synthesizes the so received state of the communication traffic, from the respective base stations, to give a decision as to whether or not the uplink of the wire section is in a congested state. Based on the results of decision, the user control station 6 produces a second state indicator, representing whether or not the uplink of the wire section is in a congested state or in a non-congested state, and sends the so generated state indicator to the radio control station 2 each time state transition occurs.

Based on the first and second state indicators, received from the user control station 6, the radio control station 2 recognizes the current state of the wireless section and the wire section. If, when the current state is recognized to be the congested state, a line connection request is received from the mobile station 5, the radio control station 2 sends a control signal to the effect that the line connection request received shall be refused, to the mobile station 5, without managing control for radio link setting.

The radio control station 2 sends a signal for confirming the state report to the user control station 6, for confirmation, lest the state in the radio jurisdiction, received from the user control station 6, should be recognized in a mistaken fashion. If the state report received is different from the state information, previously transmitted, the user control station 6 retransmits the previously transmitted state information to the radio control station 2. Hence, the radio control station 2 gives accurate decision on the congested state and on the non-congested state, based on the state report or the second state report from the user control station 6.

The above-described operations are basically the same as those of the first embodiment previously described. However, there are certain points of difference, namely a point of difference that the decision of the state in the uplink and downlink of the wireless section and in the downlink of the wire section, formulation of the state indicators based on the results of decision and reports thereof to the radio control station, carried out in the first embodiment by the base station, are carried out by the user control station 6, and a point of difference that the decision of the state in the uplink of the wire section, formulation of the state indicators based on the results of decision and reports thereof to the radio control station, carried out in the first embodiment by the radio control station, are carried out by the user control station 6. By concentrated control of the formulation of the state indicators in the user control station 6, the base station may be simpler in configuration, while the state of interferences between neighboring base stations may be comprehended accurately.

Fourth Embodiment

The mobile communication system of the fourth embodiment of the present invention will now be described. The mobile communication system of the present fourth embodiment corresponds to the system of FIG. 14 in which acceptance control is carried out in accordance with the three states of acceptance control of the above-described second embodiment, that is, the request accepting state, handover accepting state and the block state.

Since the basic operation is already described in the second and third embodiments, previously described, only the operation of the acceptance control, which is typical of the present embodiment, will now be described only briefly.

Each time a wireless section is added to or deleted from each of the uplink and downlink of the wireless section, each of the base stations 3a and 3b finds the current load and sends the result thus found to the user control station 6. For each of the base stations, the user control station 6 verifies, from the values of the loads of the uplink and the downlink, supplied from the base stations, the request accepting state, handover accepting state and the block state, based on the conditions 1 to 3, described in the above-described second embodiment. Based on the results of the verification, the user control station produces a third state indicator, which is sent to the radio control station 2.

From the third state indicator, received from the user control station 6, the radio control station 2 recognizes the current state of the wireless section. If the current state is recognized to be the request accepting state, the radio control station 2 allows the connection relating to the new line connection request and the handover connection request. In the handover accepting state, the new line connection request is refused. However, for preventing the communication quality from becoming deteriorated due to path disconnection ascribable to migration of the mobile station across different radio jurisdictions, the handover connection request is allowable. In the block state, the new path request and the handover connection request are both refused for maintaining the communication quality.

The above-described operations are basically the same as those of the second embodiment previously described. However, there is a point of difference that the decision of the three states, namely the request accepting state, handover accepting state and the block state, and the formulation of the third state indicator based on the results of decision, as well as reporting thereof to the radio control station, taken care of by the base stations in the second embodiment, are carried out by the user control station 6. By the user control station managing concentrated control of the generation of the third state indicator, the base station may be simpler in configuration, while the relation of interferences between neighboring base stations may be comprehended accurately.

In the foregoing, explanation has been made of the specified configuration and the operation of the first to fourth embodiments of the mobile communication system of the present invention. However, the present invention is not limited to these specified embodiments, and the configuration thereof may be suitably changed without departing from the scope of the invention which resides in reducing the unneeded processing operations in the radio control stations in congested state and in reducing the amount of control signal transmitted or received.

Although the present invention is applied to a CDMA based system, in particular the W (wideband)-CDMA based system, it is to be noted that the present invention may also be applied to the mobile communication system employing other multiple access types.

The invention claimed is:

1. A mobile communication system comprising:
a base station connected to a core network;
at least one mobile station connected to said core network through a communication line via said base station; and
a radio control station for controlling the setting of a radio link in said base station for said mobile station;
said base station monitoring whether or not said communication line is congested, and formulating, based on the results of monitoring, a state indicator indicating which of the congested state and the non-congested state is the current state of said communication line, said base station sending said state indicator to said radio control station each time state transition occurs between said congested state and the non-congested state;
said radio control station recognizing the current state of said communication line based on said state indicator received from said base station; said radio control station transmitting, when said communication line is recognized to be congested, and a request for line connection is received from said mobile station, a control signal to the effect that the request for line connection received shall be refused, to said mobile station, without performing control for setting said radio link,
wherein said communication line includes a wireless section associated with a radio jurisdiction supervised by said base station;
said base station transmitting, as said state indicator, a first state indicator, indicating which of the congested state and the non-congested state is the current state of said wireless section, to said radio control station,
wherein said base station finds the load for each of the uplink and the downlink of said wireless section, each time said radio link is added or deleted and generates a third state indicator indicating which of three states comprising a request accepting state, a handover accepting state, and a block state, is the current state of said wireless section, with the state of the load on the uplink as found and the state of the load on the downlink as found both being equal to or lesser than a first threshold value, being the request accepting state,
with the state of one of the load on the uplink as found and the load on the downlink as found equal to or lesser than the first threshold value, with the other load being larger than said first threshold value and equal to or lesser than a second threshold value larger than said first threshold value, being the handover accepting state, and
with the state of at least one of the load of the uplink and the load of the downlink thus found being larger than said second threshold value, being the block state;
said base station sending the so generated third state indicator to said radio control station; and
wherein said radio control station recognizes the current state of said wireless section based on said third state indicator received from said base station to determine whether or not the line connection request from said mobile station is allowable.

2. The mobile communication system as claimed in claim 1, wherein said base station measures downlink transmission power, as the total transmission power of the downlink of said wireless section from said core network to said mobile station, said base station giving a decision as to the congested state or said non-congested state based on the measurement result.

3. The mobile communication system as claimed in claim 1, wherein said base station measures the quantity of uplink interferences, approximated by the total received power in the uplink of said wireless section, from said mobile station to said core network, said base station giving a decision as to the congested state or said non-congested state based on the measurement result.

4. The mobile communication system as claimed in claim 1, wherein said communication line includes a wire section, allocated to said base station;
said base station sending, as said state indicator, a second state indicator, indicating which of the congested state and the non-congested state is the current state of the downlink of said wire section proceeding from said core network to said mobile station, to said radio control station.

5. The mobile communication system as claimed in claim 4, wherein said base station measures the communication traffic, flowing through the downlink of said wire section, and gives a decision as to the congested state or said non-congested state based on the result of measurement.

6. The mobile communication system as claimed in claim 4, further comprising:
a plurality of said mobile stations;
said plural mobile stations each measuring the communication traffic sent from the own station and sending the result of measurement to said radio control station as the state of the communication traffic, flowing through the uplink of said wire section proceeding to said core network;
said radio control station synthesizing the state of the communication traffic received from each of the mobile stations, and giving a decision, based on the resulting synthesized value, whether or not said uplink of said wired domain is congested.

* * * * *